No. 808,086. PATENTED DEC. 26, 1905.
A. HEIL.
THERMO ELECTRIC BATTERY.
APPLICATION FILED OCT. 31, 1904.

Witnesses
Inventor
Albrecht Heil
Attorneys

UNITED STATES PATENT OFFICE.

ALBRECHT HEIL, OF FRANKFORT-ON-THE-MAIN, GERMANY, ASSIGNOR TO THE FIRM OF A. WOLF, JR., & CO., OF FRANKFORT-ON-THE-MAIN, GERMANY.

THERMO-ELECTRIC BATTERY.

No. 808,086. Specification of Letters Patent. Patented Dec. 26, 1905.

Application filed October 31, 1904. Serial No. 230,792.

*To all whom it may concern:*

Be it known that I, ALBRECHT HEIL, a subject of the German Emperor, and a resident of Frankfort-on-the-Main, Germany, have invented certain new and useful Improvements in Thermo-Electric Batteries, of which the following is a specification.

My invention relates to improvements in thermo-electric batteries in which a central vertical and hollow heating shaft or flue is provided on the external surface with a plurality of insulated radial thermo-electric couples; and the objects of my improvements are, first, to provide the external surface of the central vertical and hollow shaft or flue with a layer of insulating material; second, to provide on this layer of insulating material a plurality of heating-plates, which are mostly in contact with the insulating layer and for the rest bent to project outward, preferably horizontally; third, to provide a plurality of thermo-electric couples, whose warm ends are united with the projecting ends of the heating-plates in as narrow or small contact-faces as possible, and, fourth, to provide a plurality of radial and vertical cooling-plates, which are each united with the external ends of the positive components of a thermo-electric couple and with the external end of the negative component of a neighboring thermo-electric couple. I attain these objects by the arrangement illustrated in the accompanying drawings, in which—

Figure 1:
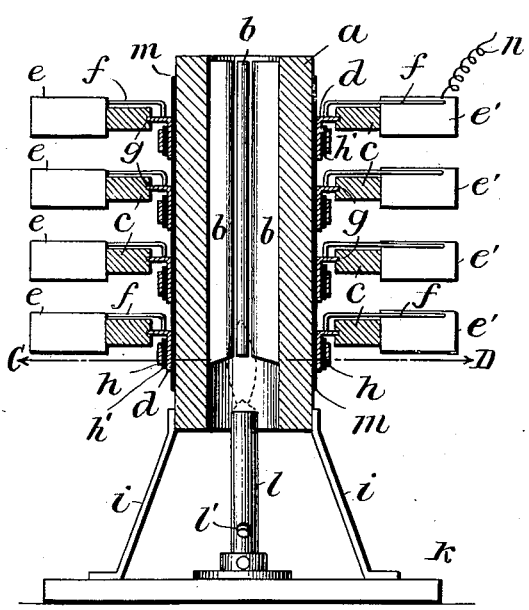
Figure 3:
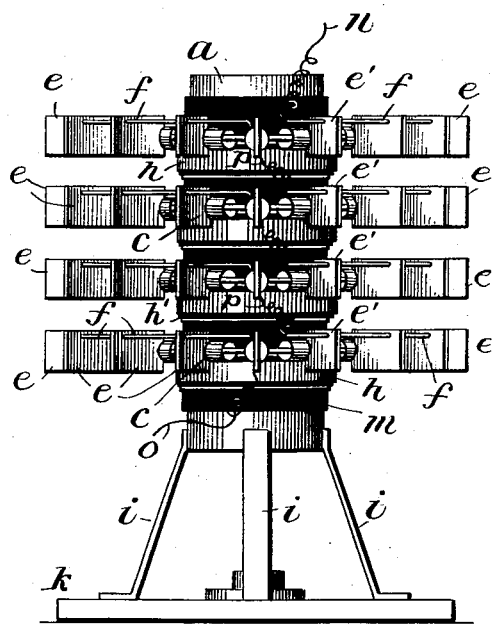
Figure 2:
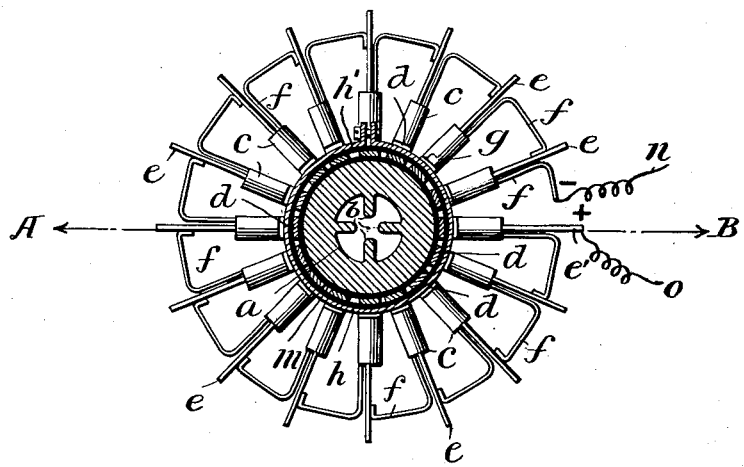

Figure 1 is a vertical central section through a thermo-electric battery on the line A B in Fig. 2, the positive components of the couples being shown in section. Fig. 2 is a horizontal section through the same on the line C D in Fig. 1 seen in the direction from below, and Fig. 3 is a side elevation of the same.

Similar letters of reference refer to similar parts in the several views.

I have shown a thermo-electric battery arranged for heating by a gas-flame; but it is to be understood that I do not limit myself to this construction, as this battery can be equally arranged for heating by liquid or solid combustibles by merely modifying the construction of the central heating flue or shaft.

The central vertical heating-flue $a$ is made of a convenient thickness and preferably provided with several (here four) internal radial longitudinal heating-ribs $b\, b$. The flue $a$ is supported by several legs $i\, i$ on a base-plate $k$, and in the center of the latter a vertical gas-pipe $l$ is disposed, which is provided with a branch $l'$ for the attachment of a gas-hose or other supply-tube. The vertical pipe $l$ extends up to a convenient point near the lower end of the flue $a$, and the gas-flame on the upper end of the pipe $l$, as indicated by the dotted lines, is arranged for heating the walls of the flue $a$ and the longitudinal ribs $b\, b$.

The external surface of the flue $a$ is provided with a lining $m$ of insulating material, and on this lining $m$ a plurality of heating-plates $d\, d$ in several (here four) superposed rows are applied and secured by means of bands $h\, h$, insulated therefrom, as indicated at $h'$. Thus the heating-plates $d\, d$ are mostly in contact with the lining or layer $m$ and their upper ends are bent to project outward, preferably in a horizontal direction, as shown. On the heating-plates $d\, d$ the thermo-electric couples consisting of the components $c\, c$ and $f\, f$ are secured by means of as narrow or small contact faces or sections as possible, so as to obtain as great a difference of temperatures as possible or a high potential difference between the internal warm ends and the external cold ends of the couples. The positive components $c\, c$ are shown as cast around thin pins $g\, g$ on the ends of the horizontal parts of the heating-plates $d\, d$ and may be cylindrical in shape, as usual. The negative components $f\, f$ are shown as wires of small cross-section, so as to increase their electrical resistance. Their internal ends are united in any known manner with the horizontal projections of the heating-plates $d$ near the pins $g\, g$, or they may be united direct with the latter. On the external ends of the several positive components $c\, c$ radial and vertical metallic cooling-plates $e\, e$ are secured in any known manner. The negative components $f\, f$ are shown as secured vertically on the horizontal projections of the heating-plates $d\, d$ and bent horizontally parallel to the positive components $c\, c$ or radially and then bent about in the periphery of a circle, (see Fig. 2,) so that their ends extend to the cooling-plates $e\, e$ of the neighboring couples, with which they are united in any known and approved manner. It is to be noted, however, that in each horizontal row of couples a gap (in Fig. 2 on the right) is left, so that in the uppermost row the external end of, say, the negative component $f$ of the last couple may be connected with the one line $n$ of the circuit, and the cooling-plate $e'$ of the neighboring couple, which is disconnected from the last couple, may be connected with the negative component $f$ in the next lower row immediately beneath that of the last couple; further, that the cooling-plate $e'$ in this row may be connected with the negative component $f$ in the third row (when counting downward) immediately beneath that just referred to, then that the cooling-plate $e'$ in the third row may be connected with the respective negative component $f$ in the lowermost row, and that the cooling-plate $e'$ of the last couple in this row may be connected with the other line $o$ of the circuit, as is clearly shown in the drawings. It will be seen that the current will run through the thermo-electric battery in a somewhat spiral line. Of course the arrangement may be reversed, the line $o$ being connected with the cooling-plate $e'$ in the uppermost row, and the other line $n$ with the respective negative component $f$ in the lowermost row, or the arrangement may be altered to suit the circumstances.

The thermo-electric battery described so far is operated as follows: On admitting the gas in any known manner to the vertical pipe $l$ and lighting it the flame produced will heat the longitudinal ribs $b\ b$ and the flue $a$ until their temperature attains a certain limit. As the several heating-plates $d$ are mostly in contact with the insulating layer $m$, of course they will receive the heat from the flue $a$ by transmission and attain about the same temperature as the flue $a$. The heating-plates $d\ d$ being in contact with the components of the thermo-electric couples only by means of narrow or small faces or sections it follows that they do not lose their heat too quickly by giving it off to the warm internal ends of the components. The cooling-plates $e\ e\ e'$ will be cooled by a stream of cold air passing upward and taking off their heat, as usual. The external ends of the components are thus kept cold by the cooling-plates $e\ e\ e'$. By means of the narrow or small contact-faces between the heating-plates $d\ d$ and the components of the thermo-electric couples the heat of the gas-flame is made use of in a most economical manner, so that a high useful effect is obtained which is far higher than that of the other known thermo-electric batteries of a similar kind. The new battery is very durable and its construction is simple. With the aid of the new battery it is possible to convert the heat developed from any combustible into electrical energy in a most effective manner, which hitherto was never attained. All the various couples are heated most uniformly and economically. The battery can be manufactured in a cheap and simple manner, which was hitherto not possible.

As is obvious to any one versed in the art to which this invention appertains, the new battery can be arranged for heating by liquid or solid combustibles. When employing liquid combustibles, a lamp of any known and approved construction is placed beneath the flue $a$ on a suitable base-plate, and it may be surrounded by a mantle provided with air-inlet holes, if so preferred. When employing solid combustibles, the flue $a$ may be constructed in a similar manner as the shaft of any known furnace. The number of the thermo-electric couples may be increased or reduced to attain the desired result. It may be stated that when employing coke for heating the flue $a$ or shaft of the respective furnace as much as forty watts can be produced from each kilogram by means of the new thermo-electric battery. Such a result has never before been attained by any known thermo-electric battery.

The difference of temperatures between the warm and the cold ends of the thermo-electric couples is considerable and can be retained for a long time, even if quite short components with a low electrical resistance be employed. The highest useful effect of the battery can be obtained just by these short components of a low electrical resistance. It depends upon the size of the components of the thermo-electric couples or their sections whether they may be applied direct to edges or suitable contact-faces of the heating-plates and therewith united.

I am aware that there are thermo-electric batteries with internally-heated and externally-insulated flues and a plurality of couples arranged on the external faces of the flues; but they are quite distinct from the new battery according to my invention. For instance, in the thermo-electric battery described in the British patent specification, No. 7,822, of the year 1891, there are couples united with heating-bodies, it is true; but these heating-bodies consist in metallic sockets, which surround the ends of the components, and are then in contact with the latter in very large faces. There are also thermo-electric batteries the couples of which are heated direct by a flame or the gases therefrom, which, however, is quite different from my invention.

The new thermo-electric battery may be varied in many respects without deviating from the spirit of my invention.

What I claim as my invention, and desire to secure by Letters Patent, is—

1. In a thermo-electric battery, the combination with a flue provided externally with a layer of insulating material, of means for heating said flue internally, a plurality of heating-plates on the insulating layer of said flue and having each an end projecting outward, a plurality of radially-disposed thermo-electric couples, whose internal ends are united with the projecting ends of said plurality of heating-plates in narrow or small contact-faces, and a plurality of radial cooling metallic plates secured on the external ends of the positive components of said plurality of thermo-electric couples and united each with the bent external end of the negative component of a neighboring couple, so that the several couples are connected and the cooling-plate of the first couple may be connected with the one line and the negative component of the last couple with the other line of the circuit.

2. In a thermo-electric battery, the combination with a heating-plate arranged to be heated from the source of heat and having a projecting end, of a thermo-electric couple comprising a positive rod-shaped component and a negative wire-shaped component whose warm ends are united with the projecting end of said heating-plate in narrow or small contact-faces.

3. In a thermo-electric battery, the combination with a flue heated internally and provided externally with a layer of insulating material, of a heating-plate on the insulating layer of said flue and having an end projecting outward, and a radially-disposed thermo-electric couple comprising a positive rod-shaped component and a negative wire-shaped component whose warm ends are united with the projecting end of said heating-plate in narrow or small contact-faces.

4. In a thermo-electric battery, the combination with a vertical flue provided internally with a plurality of longitudinal radial heating-ribs and externally with a layer of insulating material, of means for heating said vertical flue internally, a plurality of heating-plates on the insulating layer of said vertical flue and having each an end projecting outward, a plurality of radially-disposed thermo-electric couples comprising each a positive rod-shaped component and a negative wire-shaped component whose warm ends are united with the projecting end of one of said plurality of heating-plates in narrow or small contact-faces, and a plurality of radial cooling metallic plates secured on the external ends of the positive components of said plurality of thermo-electric couples and united each with the bent external end of the negative component of a neighboring couple, so that the several couples are connected and the cooling-plate of the first couple may be connected with the one line and the negative component of the last couple with the other line of the circuit.

5. In a thermo-electric battery the combination with a flue provided externally with a layer of insulating material of means for heating said flue internally, a plurality of heating-plates on the insulating layer of said flue, having each an end projecting outward, and an insulated metal ring for securing said plates in position.

In testimony whereof I have signed my name to this specification in the presence of two subscribing witnesses.

ALBRECHT HEIL.

Witnesses:
FRANZ HAPLACHER,
ERWIN DIPPEL.